(12) United States Patent
Saunders et al.

(10) Patent No.: US 7,026,946 B2
(45) Date of Patent: Apr. 11, 2006

(54) METHOD AND APPARATUS FOR SENSING SEAT OCCUPANCY

(76) Inventors: Darrel Saunders, 11341-122 Street, Edmonton, Alberta (CA) T5M 0B6; Lynn Johner, 12411 Jasper Avenue, Edmonton, Alberta (CA) T5M 3K9; Petr Musilek, 3339 118 Street N.W., Edmonton, Alberta (CA) T6J 3J5

( * ) Notice: Subject to any disclaimer, the term of this patent is extended or adjusted under 35 U.S.C. 154(b) by 297 days.

(21) Appl. No.: 10/249,913

(22) Filed: May 16, 2003

(65) Prior Publication Data

US 2003/0220766 A1 Nov. 27, 2003

Related U.S. Application Data

(63) Continuation-in-part of application No. 10/249,527, filed on Apr. 16, 2003.

(60) Provisional application No. 60/373,312, filed on Apr. 17, 2002.

(51) Int. Cl.
   *G08B 21/00* (2006.01)
   *B60R 21/32* (2006.01)
   *B60R 22/00* (2006.01)
   *B60K 28/00* (2006.01)
   *G01G 19/52* (2006.01)

(52) U.S. Cl. ............ 340/666; 340/665; 340/666; 340/667; 340/668; 701/45; 701/46; 701/47; 701/48; 701/49; 280/734; 280/735; 180/271; 180/272; 180/273; 177/144; 177/177; 73/862

(58) Field of Classification Search ........ 340/665–668; 280/734–735; 701/45–49; 180/271–273; 177/144–177; 73/862
   See application file for complete search history.

(56) References Cited

U.S. PATENT DOCUMENTS

| | | | |
|---|---|---|---|
| 4,738,325 A * | 4/1988 | Bullivant et al. .... | 177/210 EM |
| 5,232,243 A | 8/1993 | Blackburn et al. | |
| 5,541,591 A | 7/1996 | Bush | |
| 5,570,903 A * | 11/1996 | Meister et al. ........... | 280/735 |
| 5,971,432 A | 10/1999 | Gagnon et al. | |
| 6,081,757 A | 6/2000 | Breed et al. | |
| 6,088,640 A | 7/2000 | Breed | |
| 6,101,436 A | 8/2000 | Fortune et al. | |
| 6,116,639 A | 9/2000 | Breed et al. | |
| 6,129,168 A * | 10/2000 | Lotito et al. ............. | 180/273 |
| 6,134,492 A | 10/2000 | Breed et al. | |

(Continued)

FOREIGN PATENT DOCUMENTS

DE 199 47 733 A1 8/2001

(Continued)

*Primary Examiner*—Jeffery Hofsass
*Assistant Examiner*—Lam Pham
(74) *Attorney, Agent, or Firm*—Daryl W. Schnurr

(57) ABSTRACT

Method and apparatus for identifying and categorizing the weight and characteristics of the occupant currently occupying a vehicle seat. The method for identifying and categorizing the occupant or object involves measuring the deflection of the upper surface of the seat cushion at several points and therefore the weight distribution of the occupant. The system contains multiple weight sensors arrayed for detecting the distribution of the load causing the seat deflection. The system also includes a sensor to measure ambient temperature, preferably for temperature compensation due to the effects extreme temperatures may have on the compression properties of the seat cushion material and the weight sensors. A system processor interprets the data acquired by the sensors, and utilizes an algorithm and weight tables to simulate a neural network in providing an output a control signal indicative of the categorization of the occupant or object.

24 Claims, 15 Drawing Sheets

U.S. PATENT DOCUMENTS

| | | | |
|---|---|---|---|
| 6,141,432 A | 10/2000 | Breed et al. | |
| 6,168,198 B1 | 1/2001 | Breed et al. | |
| 6,186,537 B1 | 2/2001 | Breed et al. | |
| 6,220,627 B1 | 4/2001 | Stanley | |
| 6,234,519 B1 | 5/2001 | Breed | |
| 6,234,520 B1 | 5/2001 | Breed et al. | |
| 6,242,701 B1 | 6/2001 | Breed et al. | |
| 6,253,134 B1 | 6/2001 | Breed et al. | |
| RE37,260 E | 7/2001 | Varga et al. | |
| 6,254,127 B1 | 7/2001 | Breed et al. | |
| 6,270,116 B1 | 8/2001 | Breed et al. | |
| 6,279,946 B1 | 8/2001 | Johnson et al. | |
| 6,283,503 B1 | 9/2001 | Breed et al. | |
| 6,324,453 B1 | 11/2001 | Breed et al. | |
| 6,325,414 B1 | 12/2001 | Breed et al. | |
| 6,330,501 B1 | 12/2001 | Breed et al. | |
| 6,331,014 B1 | 12/2001 | Breed | |
| 6,345,839 B1 * | 2/2002 | Kuboki et al. | 280/735 |
| 6,353,394 B1 | 3/2002 | Maeda et al. | |
| 6,393,133 B1 | 5/2002 | Breed et al. | |
| 6,397,136 B1 | 5/2002 | Breed et al. | |
| 6,407,347 B1 | 6/2002 | Blakesley | |
| 6,412,813 B1 | 7/2002 | Breed et al. | |
| 6,416,080 B1 | 7/2002 | Gillis et al. | |
| 6,422,595 B1 | 7/2002 | Breed et al. | |
| 6,442,465 B1 | 8/2002 | Breed et al. | |
| 6,442,504 B1 | 8/2002 | Breed et al. | |
| 6,445,988 B1 | 9/2002 | Breed et al. | |
| 6,452,870 B1 | 9/2002 | Breed et al. | |
| 6,476,514 B1 | 11/2002 | Schondorf | |
| 6,526,806 B1 | 3/2003 | Kuttenberger | |
| 6,529,809 B1 | 3/2003 | Breed et al. | |
| 6,532,408 B1 | 3/2003 | Breed | |
| 6,536,797 B1 | 3/2003 | Reich | |
| 6,609,054 B1 * | 8/2003 | Wallace | 701/45 |
| 6,662,138 B1 * | 12/2003 | Takafuji et al. | 702/173 |
| 2003/0196495 A1 | 10/2003 | Saunders et al. | |
| 2003/0220766 A1 | 11/2003 | Saunders et al. | |
| 2004/0174004 A1 * | 9/2004 | Smith et al. | 280/735 |

FOREIGN PATENT DOCUMENTS

| | | |
|---|---|---|
| EP | 0 728 636 A1 | 8/1996 |
| WO | WO 95/24616 | 9/1995 |
| WO | WO 00/50856 | 8/2000 |
| WO | WO 01/85497 A1 | 11/2001 |
| WO | WO 2004/013588 A1 * | 2/2004 |

* cited by examiner

METHOD AND APPARATUS FOR SENSING SEAT OCCUPANCY

This Application is a continuation-in-part of U.S. Ser. No. 10/249,527 filed Apr. 16, 2003 entitled "Method and Apparatus for Sensing Seat Occupancy" and claims the benefit of U.S. Provisional Application No. 60/373,312, filed Apr. 17, 2002.

BACKGROUND OF THE INVENTION

This invention generally relates to the field of automatic occupancy sensing systems for use in vehicle seats. More specifically, it relates to methods and apparatus employed to produce data corresponding to the weight and the weight distribution or compression pattern of the seat occupant and to gather and interpret the data by a computerized system.

The automotive airbag was designed to provide protection to passengers during vehicle collisions. Traditionally, the passenger-side airbag has been permanently ready to deploy in case of a collision involving front or side impact. However concerns about the impact on children and small adults have led to developments that may allow the driver or passenger to disengage the airbag by way of an on/off toggle or key switch. Because of its nature, i.e. operator/manual control, there is a chance of operator error by forgetting or neglecting to actuate the switch to the setting appropriate to the type of person occupying the passenger seat. The US National Highway Transportation and Safety Administration NHTSA issued a Federal Motor Vehicle Safety Standard FMVSS-208, to combat the danger due to operator error and for other reasons. FMVSS-208 requires that 25% of all passenger vehicles produced in the United States, during and after 2004, have an automatic airbag deployment suppression system. The automatic airbag deployment suppression system must determine the mode of airbag deployment to be either fully enabled or fully suppressed based on the current occupant of the seat. By 2008, the automatic airbag deployment suppression system must also control the rate and percentage of airbag deployment depending on the current occupant of the passenger seat and be present in 100% of all new vehicles produced or sold in the United States.

Several patents cited with this application illustrate attempts by others to sense whether the occupant in the passenger seat is an adult above a certain weight or not and provide a deactivation signal to the air bag deployment control if not. Many of the prior patents show the use of multiple sensors in multiple locations to determine such things as whether the occupant is a human being, the location of the face and more elaborate determinations. Many systems found in the prior art are complex and expensive to fabricate, calibrate and maintain.

SUMMARY OF INVENTION

The present application addresses the aforementioned problems of determining the appropriate deploying of airbags during vehicle collisions and the aforementioned requirements of FMVSS-208 by providing a novel method and apparatus for automatically sensing occupancy in a vehicle seat.

The system of the present invention is capable of distinguishing between the different patterns created by different occupants and their various seating positions on the seat, such as weight distribution patterns. The system's preferred purpose, but not its sole purpose, is to read sensor signals, interpret the signals, and relay data via the system processor to other vehicle management systems. For instance, another vehicle management system, that is not part of this invention, will determine the mode of the passenger-side airbag deployment system based on measured characteristics of the current seat occupant made by the system of the present invention.

In the present invention, method and apparatus are provided for identifying and categorizing the weight and weight distribution characteristics, (e.g., distribution or compression pattern) of the occupant occupying a seat in a vehicle. The method and apparatus of the present invention is embodied in a system that identifies and categorizes the occupant load placed on the seating surface or cushion of a seat—commonly referred to in the seating industry as a "seat bun". This is done, whether the occupant load is human or otherwise and returns information that is useful for the management of various vehicle sub-systems.

The method for identifying and categorizing the occupant comprises measuring the deflection of the upper surface of the seat bun at multiple points due to compression as caused by the occupant. In its simplest embodiment, a single sensor made up of a sensor/emitter pair e.g., a Hall-effect sensor can be used to measure the load weight. However, in order to include the ability to measure the weight distribution pattern, the system utilizes multiple sensor/emitter pairs for detecting this deflection. In one embodiment, a two dimensional array of deflection sensors are used to detect the change in the distance between the upper and lower sections or surfaces of the seat bun at multiple points when an occupant load is applied. The sensors are physically connected to a flat substrate beneath the seat cushion. The sensors are responsive to a weight load placed on the seat cushion as the distance between the emitters and the sensors varies due to load compression of the cushion against the substrate. The use of multiple sensors in a predetermined array causes sensors to provide signals that can be analyzed in the form of a three-dimensional topographical map indicative of the load and distribution pattern. A processor receives the sensor output signals, to determine the occupant's weight and its weight distribution pattern and to provide data useful in the control of other vehicle sub-systems.

A neural network or other predictive learning or training method may be used to generate tables of variable factors unique to the particular seat configuration and construction. The on-board system processor can then utilize the tables in applying its analysis algorithm to the sensor readings in order to simulate a neural network analysis and generate meaningful output data to the vehicle control sub-systems.

The invention may also include an ambient air temperature sensor to measure the temperature within the vehicle. The information from the temperature sensor is used to compensate for the effect that temperature variations may have on the response characteristics of the sensors and the compression characteristics of the seat cushion material.

It is, therefore, an object of the present invention to supply a vehicle sub-system with information that can be used to control the enablement or disablement of an airbag deployment sub-system for associated airbags.

It is another object of the present invention to supply a vehicle sub-system with information that can be used to control the airbag deployment sub-system for full deployment, no deployment, or to any predetermined percentage of deployment between the two extremes.

It is a further object of the present invention to determine occupant weight, which is useful information for controlling vehicle sub-systems including, but not limited to, brake biasing, suspension valving, or abandoned occupants warning.

It is yet another object of the present invention to determine seat status, that is, whether it is empty or occupied by a human or by non-human objects, which is useful information for controlling vehicle sub-systems including, but not limited to, seat belt indicators and related or ancillary warning systems.

Broadly stated, one aspect of the apparatus of the present invention includes an array of weight sensors mounted in a seat bun, and a processor. The seat bun forms a portion of the seating cushion for a vehicle occupant's seat and has a substantially horizontal upper surface portion and a lower surface portion. Each weight sensor has first and second parts aligned for relative movement along a path that is substantially perpendicular or transverse to the seat bun surface. The first part is mounted within the seat bun and spaced below the upper surface, while the second part is mounted so as to be spaced below the first part. Each weight sensor is operative to produce signals indicative of the distance between the first and second parts and the processor receives the sensor signals and interprets the signals to produce an output that indicates the presence of a properly classified occupant in the seat.

Further objects, features, and advantages of the invention will become apparent from a consideration of the following detailed description, when taken in connection with the accompanying drawings.

DETAILED DESCRIPTION

Figure 1:
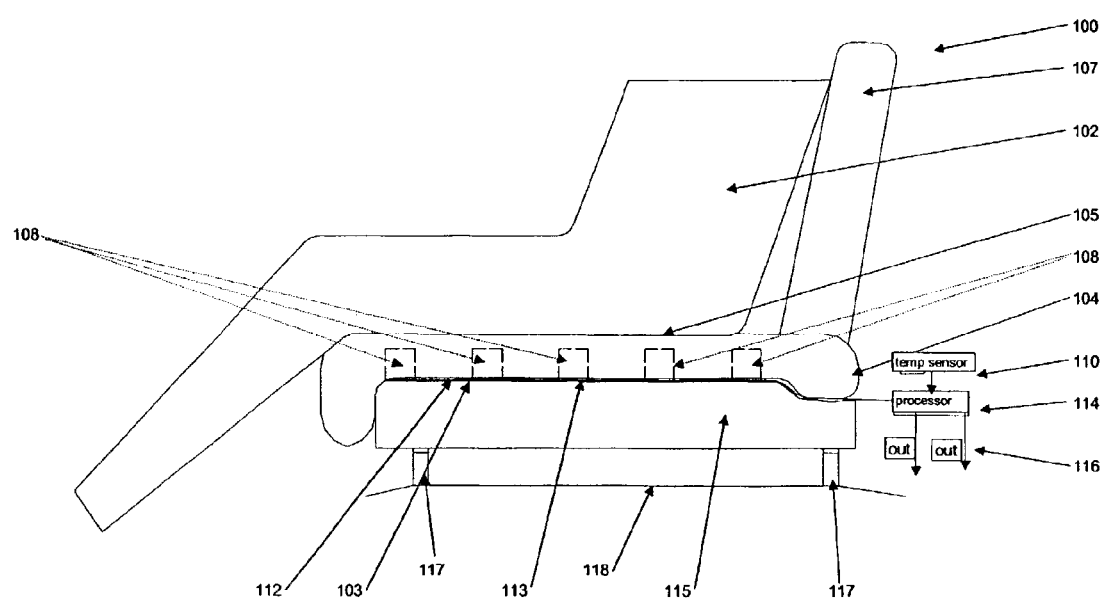
FIG. 1 is a schematic diagram illustrating an embodiment of the present invention and the inter-relationships of the various components.

In FIG. 1, an occupancy detection system 100 is shown as one embodiment of the present invention. System 100 includes a seat having an upper seat cushion or "seat bun" 104 that has an upper seating surface 105 and a lower surface 103. The seat also has a seat back cushion 107. An array of weight sensors 108 is contained within seat bun 104. A flexible circuit layer 112 is used to provide electrical interconnection between the individual sensors 108 and an associated processor 114. Flexible circuit layer 112 and sensors 108 are physically mounted on a substrate 113. Substrate 113 is more rigid than flexible circuit layer 112 and provides resistive support for the sensors when compressed by loads applied to upper seating surface 105. Substrate 113 and flexible circuit layer 112 are attached to lower surface 103 of seat bun 104. The entire seat unit is fixedly attached to a seat pan and support structure 115 that is connected to the associated vehicle by a seat adjustment or mounting mechanism represented at 117.

Each weight sensor 108 of the array contains a sensor/emitter pair that is made up of a magnetic field sensor, such as a Hall-effect sensor, and a magnetic field emitter, such as a permanent magnet. An embodiment of a weight sensor 108 is more particularly described below in the discussion of FIG. 2.

In FIG. 1, a human occupant 102 is represented as being seated on surface 105 of seat bun 104. This causes compression loading on the seat and a corresponding output from each weight sensor 108. Each weight sensor 108 transmits the data in the form of an output signal at a dc voltage level indicative of the amount of loading, via flexible circuit layer 112, to a system processor 114.

Figure 15:
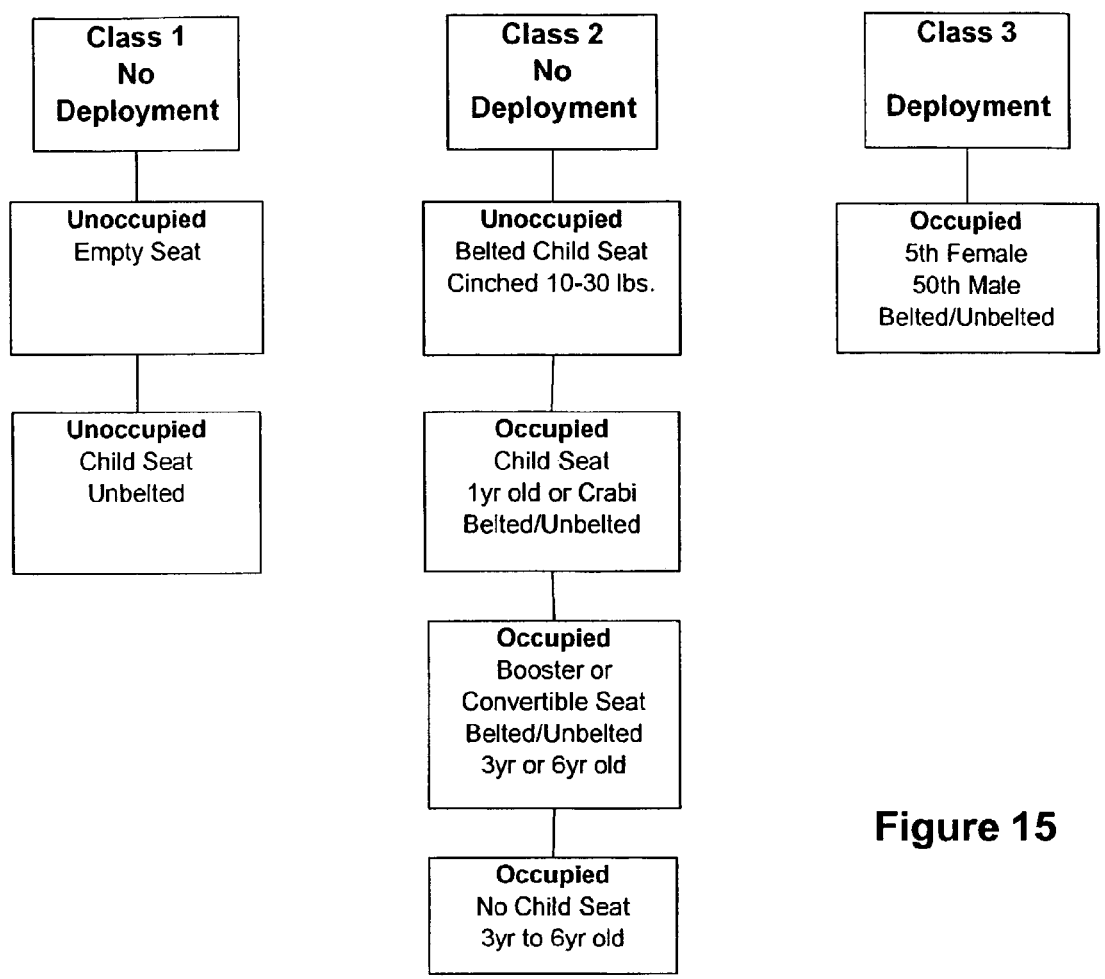
FIG. 15 illustrates the three classes or airbag deployment that are currently mandated by FMVSS-208, based upon several occupant determinations.

An ambient temperature sensor 110 may be provided and is shown as connected to system processor 114. Temperature sensor 110 is used to ascertain the ambient temperature in which system 100 is operating for the purpose of temperature compensating the data provided by sensors 108 in non-standard or extreme ambient temperatures. Once the system processor 114 has analyzed the temperature-compensated sensor data and produced the desired outputs, an output signal 116 is sent or made available to one or more external sub-systems. For instance, for an output signal 116 having a "1" value, an airbag deployment control system can use the information to enable deployment of an associated airbag in the event of a collision. Conversely, if output 116 is "0" value, an airbag deployment control system can use the information to suppress deployment of or disable an associated airbag in the event of a collision. Other variations of the output 116, i.e. output of "0.5", could be used to provide 50% or some other fractional deployment power applied to an associated airbag. FIG. 15 illustrates the current FMVSS-208 mandate. Future airbag deployment systems may utilize partial or graduated airbag deployment for some of the classifications or modes that are now mandated for no deployment, based upon the value of output signal 116.

Figure 2:
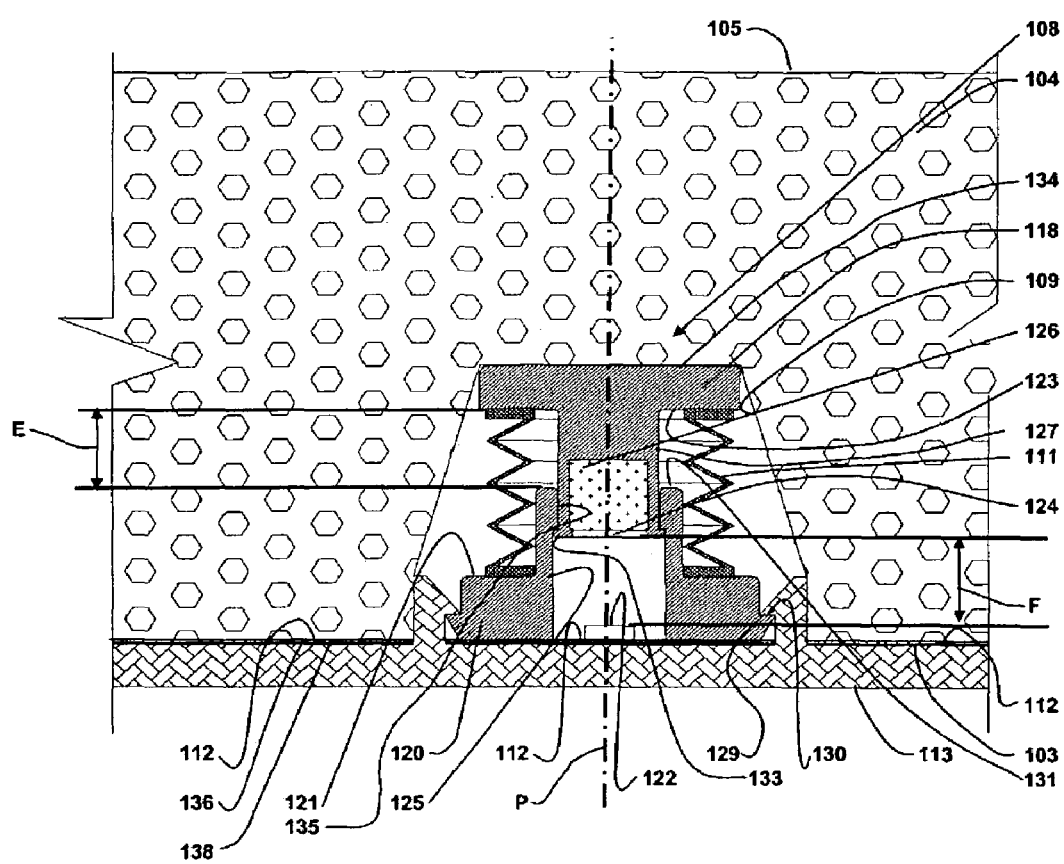
FIG. 2 is a cross-sectional view showing an embodiment of a weight sensor mounted to sense a compression load applied to a portion of a seat cushion.

In FIG. 2, a cross-sectional view is provided of one embodiment of a single weight sensor 108, as shown in FIG. 1. In this view, a cavity 109 is formed in seat bun 104 and extends upwards from lower surface 103 in a manner that provides for a significant thickness of the seat bun above the cavity. Cavity 109 is generally cylindrical in shape and has a longitudinal axis "P" aligned transverse or substantially perpendicular to upper surface 105 of seat bun 104. Cavity 109 is configured and sized to allow for accommodating the mounting of weight sensor 108 into seat bun 104.

Weight sensor 108 is shown as a unitary assembly of elements, which includes a first part comprising a plunger element 118, a second part comprising a base support element 120, and a third part comprising a spring element 111. Plunger element 118 includes a magnet 126 and base support element 120 surrounds and includes a magnetic field sensor 122. In this embodiment, sensor 122 is a ratio-metric or linear Hall-effect sensor. That is, as the magnet 126 moves towards the sensor 122, it causes a stronger magnetic field flux to be sensed by the sensor 122 and the output voltage is reduced in value. Together, the first and second parts 118 and 120 form part of a compressible housing for the weight sensor 108. Flexible circuit layer 112 provides electrical connection to sensor element 122 and is sandwiched between lower surface 103 and a substrate 113. Base support element 120 is formed about a lower central bore 125 and an upper central bore 135. Lower central bore 125 is generally cylindrical in shape, centrally aligned about axis P, and surrounds sensor 122. Lower central bore 125 has a first predetermined diameter and upper central bore 135 has a second predetermined diameter. The second predetermined diameter is less than the first predetermined diameter. Plunger element 118 contains an upper head portion 134 and a probe portion 127. Plunger element 118 is mounted on base support element 120 so that its probe portion 127 is movable along a linear travel path within both the upper and lower central bores 135 and 125, parallel to axis P. Plunger element 118 contains an embedded permanent magnet 126 in probe portion 127. An aperture 124 is formed ahead of magnet 126 in probe portion 127 to minimize resistance to the flux field emitted by magnet 126. Probe portion 127 contains a flanged extension 133 at its extreme lower end, adjacent aperture 124. Flanged extension 133 serves to slide along and to be guided by lower central bore 125 during the linear or axial path movement of probe portion 127 therein. Flanged extension 133 also serves to limit the upward movement of probe portion 127 by catching the transition wall formed between upper central bore 135 and lower central bore 125. Upper head portion 134 of plunger element 118 contains a lower surface 123 that is oriented towards base support element 120. Base support element 120 contains a shoulder surface 121 that is oriented in opposition to lower surface 123. Spring element 111 is mounted between shoulder surface 121 and lower surface 123. Spring element 111 may be a bellows, a coil spring or any other element that has the desired characteristics. The desired characteristics of spring element 111 are: a predictable spring constant over a long lifetime to allow a predetermined amount of relative movement between magnet 126 and sensor 122 for a known load; and a spring constant that is of sufficient force to restore plunger element 118 to its full height with respect to base support element 120, when no load is applied. One may also attach the upper head surface 134 to top of cavity 109 through an in-molding process, or otherwise attach the plunger element 118 to the cushion material, and thereby utilize the spring-back characteristics of the cushion material used for seat bun 104 to provide a restoration of plunger element 118 to its no load condition/position. However, by including a spring element 111 to supplement the spring-back characteristics of the seat cushion material, a more robust, reliable and accurate embodiment is attained. This is because current choices of seat cushion materials have inconsistent properties between batches, between manufacturers and over time and therefore may be unreliable to restore the plunger 118 to its proper no-load position. Certainly, if seat materials are developed that have consistent spring-back properties over the expected life of the system and vehicle, then it is possible that the separate spring element 111 could be eliminated form the sensor 108.

Base support element 120 also contains a catch ring 130 formed on its outer periphery. Latch elements 129 extend upwards from substrate 113 through cutouts 220 in flexible circuit layer 112. Latch elements 129 are arranged to retain catch ring 130 and thereby lock in place base support element 120 and the attached components of weight sensor 108.

In use, plunger element 118 is forced from its no-load or "zero" position along the travel path parallel to axis P, towards sensor 122 when a weight is placed on upper surface 105 of seat bun 104.

Plunger element 118 and also magnet 126, may move over a predetermined distance "E" that is selected such that the optimum and substantially linear performance of the sensor 122 is achieved over the range of movement between the elements along the defined linear travel path. The predetermined distance E is physically limited in the upper direction by flanged extension 133 catching the transition wall formed between upper central bore 135 and lower central bore 125; and in the lower direction by lower surface 123 contacting stop element 131. It should be noted that the limited predetermined distance E is slightly shorter than the distance "F" which indicates the maximum distance between the magnet 126 and the sensor element 122. This is purposely designed into the weight sensor 108, in order to prevent magnet 126 from physically contacting sensor 122 during maximum loading conditions. It is believed that, without his protection, repeated contact could eventually cause breakage of sensor 122, magnet 126, flexible circuit layer 112, and/or plunger element 118.

In FIG. 2, sensor 122 is shown mounted on flexible circuit layer 112, preferably composed of silver or other conductive material traces printed onto or embedded in a sheet of insulated film, such as Polyamide. Flexible circuit layer 112 may be attached to lower surface 103 with a double-sided adhesive sheet or adhesive layer 136. Substrate 113 may be attached to flexible circuit layer 112 with a double-sided adhesive sheet or adhesive layer 138. Substrate 113 provides a stable reference position for the sensor 108 and serves to seal the lower surface of the system from the elements, and also protecting the circuit from being cut or punctured by sharp objects that may be present under the seat. Although adhesives are used in this description, is it recognized and anticipated that others may chose to use other mechanisms to attach the elements to the seat cushion and have results similar to ours.

Figure 3:
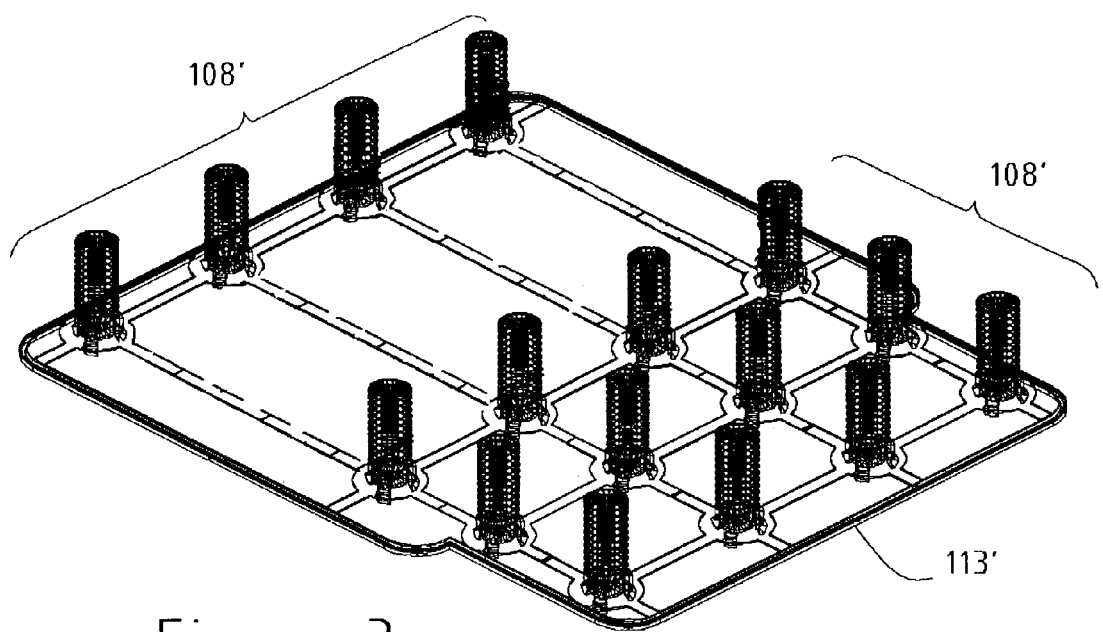
FIG. 3 is a perspective view of an array of weight sensors, such as shown in FIG. 2, mounted on a substrate.

In FIG. 3, a first array of weight sensors 108' is shown mounted on a rigid substrate 113' for assembly to a seat. Array patterns are selected according to the demands of individual seat or vehicle builders/customers and may take on a variety of specified sensing patterns.

Figure 4:
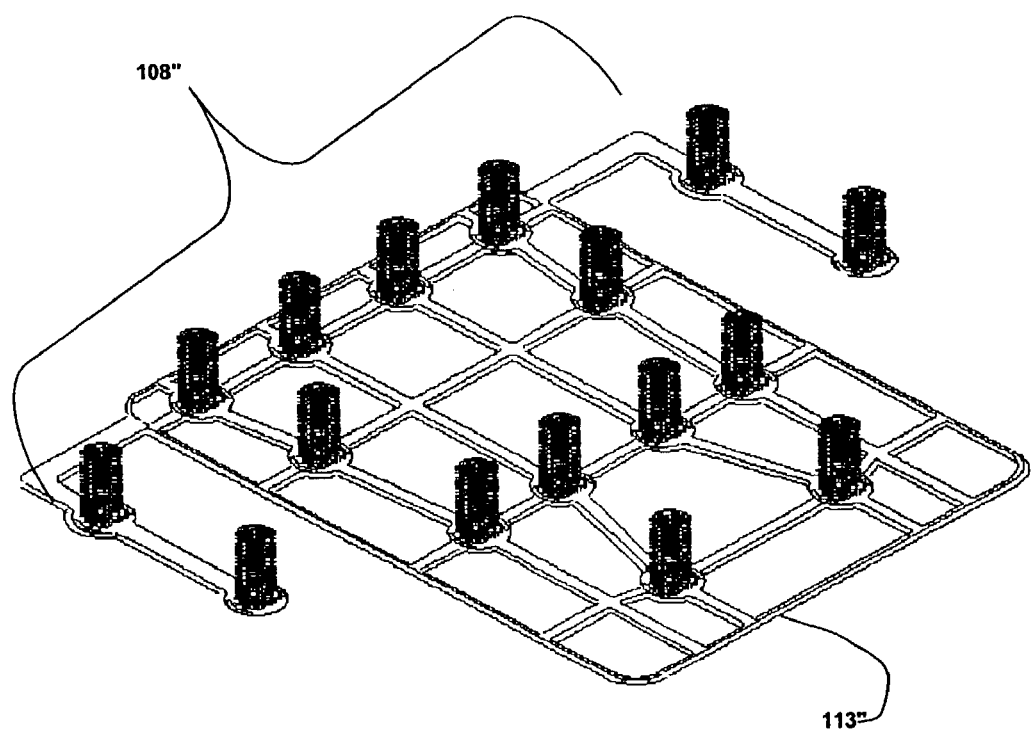
FIG. 4 is a perspective view of another array of weight sensors, such as shown in FIG. 2, mounted on a substrate.

In FIG. 4, a second array of weight sensors 108" is shown mounted on a rigid substrate 113" prior to assembly in a seat. The flexible circuit layer 112" for the array shown in FIG. 4 is further detailed in FIG. 5.

Figure 5:
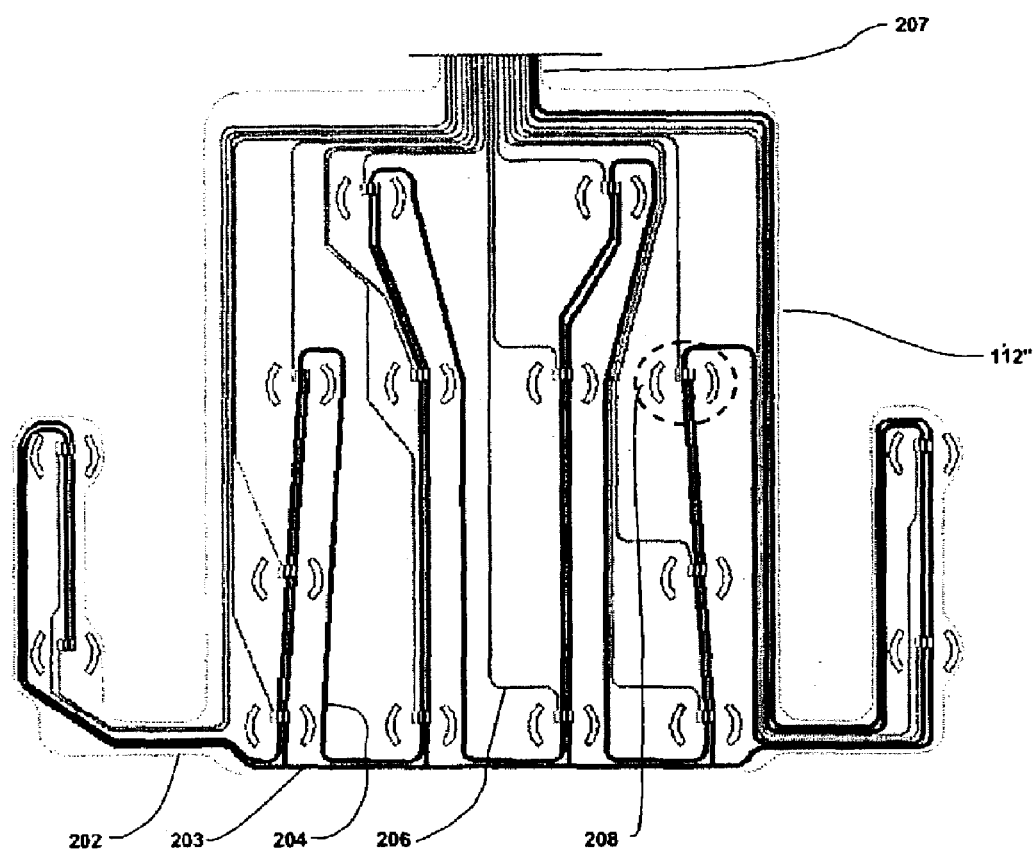
FIG. 5 is a plan view of a flexible circuit layer onto which a sensor array, such as that shown in FIG. 4, is connected.

In FIG. 5, the flexible circuit layer 112" is detailed in a plan view to show base substrate 202, power conductor 203, ground conductor 204, and sensor output conductor 206. Base substrate 202 may be a formed from a conventional material such as a polyester or Polyamide laminated to a dielectric layer. The conductors may be formed in a conventional manner, such as by etching or printing of electrically conducting metals such as silver, gold or copper. Alternatively, wires may be embedded in the laminated layer. The conductors are routed to each of the sensor locations, as exemplified at location 208, and to a tail 207 where they are connected to a power supply and processor in a conventional manner.

Figure 6:
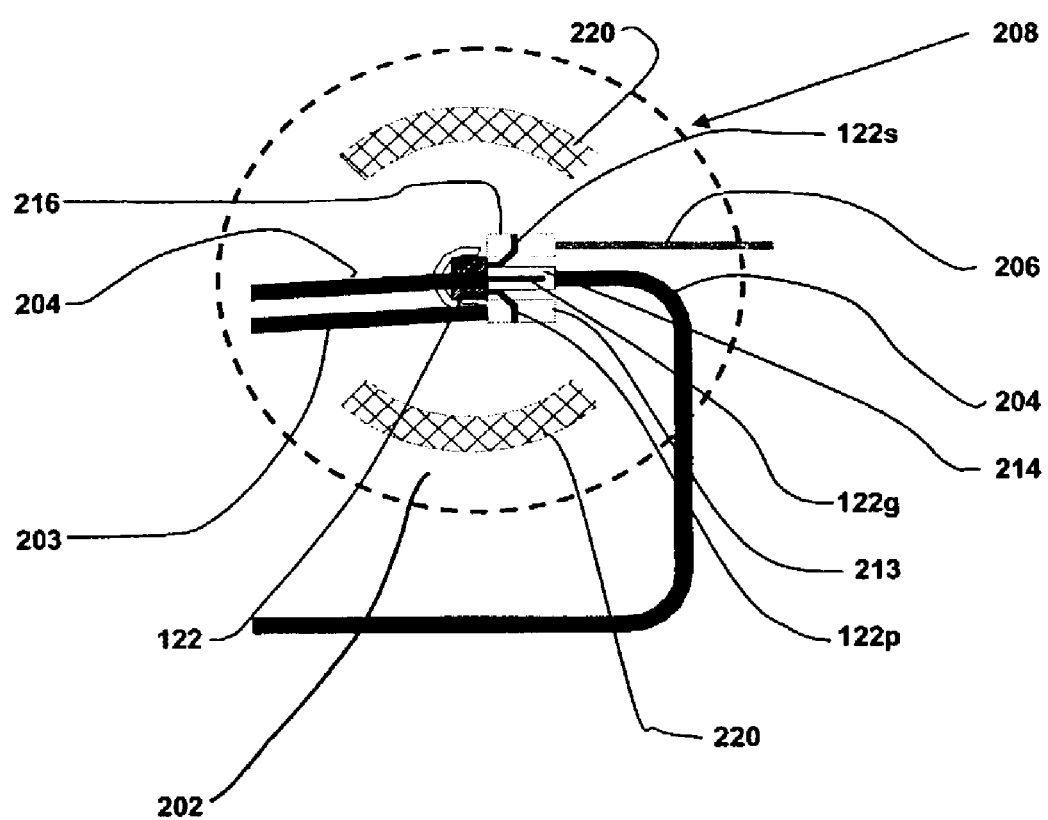
FIG. 6 is a plan view of a sensor connection portion of the flexible circuit layer shown in FIG. 5.

In FIG. 6, a detailed view is provided of sensor location 208, as shown in FIG. 5. In this view, power conductor 203, ground conductor 204, and sensor output conductor 206 are shown leading to power pad 213, ground pad 214 and output pad 216, respectively. Power terminal 122$p$, ground terminal 122$g$ and output signal terminal 122$s$ extending from the sensor 122 are shown as connected to the respectively corresponding pads 213, 214 and 216 in a conventional manner, such as by soldering, ultrasonic bonding or adhesive bonding. Cutout apertures 220 are formed on either side of the sensor 122 in base substrate 202 and are configured to accommodate the latch elements 129 that extend from rigid substrate 113, as shown in FIG. 2.

Figure 7:
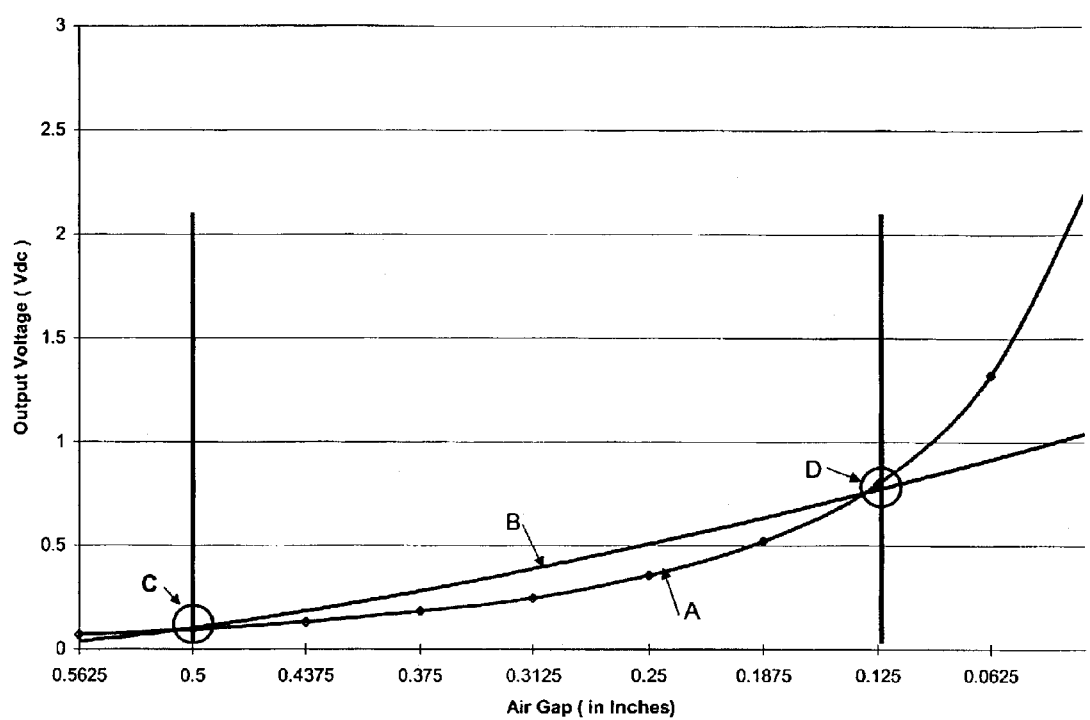
FIG. 7 is a plot of output voltage versus air gap distance for a Hall-effect sensor such as may be used in the present invention.

In FIG. 7, plot "A" shows the output voltage Vdc characteristics provided by a sensor 122 vs. the size of the air gap between sensor 122 and magnet 126 over the distance F. This portion of the sensor's output characteristics is selected for monitoring the weight applied to a seat cushion, because it is the closest to a linear output that the Hall-effect sensors produce. Point "C", at 0.5 inches in this example, shows the maximum separation between magnet 126 and sensor 122 at the preferred no-load condition. Point "D" at 0.125 inches, in this example, shows the minimum separation between magnet 126 and sensor 122 under an assumed fully loaded condition. Plot "B" illustrates the linear approximation that is used by the processor to adjust the actual voltage readings from each sensor 122 at each point along the axial travel path that readings are taken.

Figure 8:
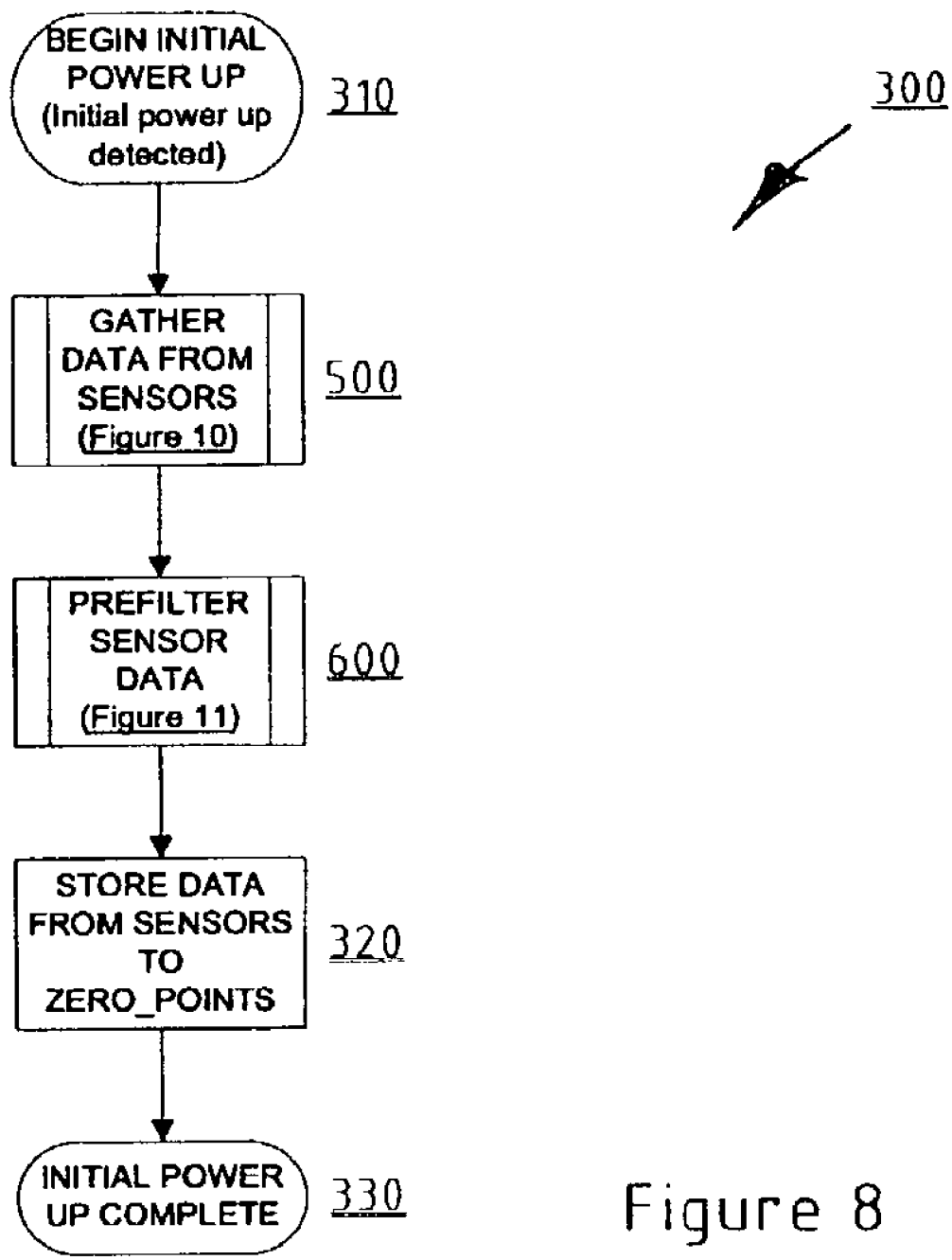
FIG. 8 is a flow chart of an initial power-up sequence that may be used to calibrate the "zero" load characteristics of the weight sensors employed in the present invention.

In FIG. 8, the flowchart illustrates the initial power-up process 300 that is used to set the "zero" reference point for the signal readings from each weight sensor, after the weight sensors are installed in a seat cushion and preferably before the seat is installed in a vehicle. This is done with no load present on the seat cushion, in order to calculate/establish the corresponding "zero" reading by each weight sensor 108. When initial power activates the system after installation of the weight sensor array within the seat and during the seat assembly procedure, the processor 114 detects this as the "first power-up" at step 310. The processor responsively initiates the data gathering protocol at sub-process 500, which is described below in association with the more detailed flow chart shown in FIG. 10. Sub-process 500 samples and gathers the output reading from each weight sensor 108 in the array. Following the data gathering sub-process 500, sub-process 600 is used to pre-filter the gathered sensor data, which is described below in association with the more detailed flow chart shown in FIG. 11. The pre-filter sub-process 600 serves to provide adjustments to the gathered sensor data, if ambient conditions such as temperature indicate that it is necessary. Following the pre-filter sub-process 600, the resultant sensor data from each sensor 122 is stored at step 320 as its "zero" point, from which future readings of the respective sensors are compared in order to determine the degree of loading that is being sensed. Following the storage of the sensor zero readings at step 320, initial power-up process 300 is recorded as being completed at step 330.

Figure 9:
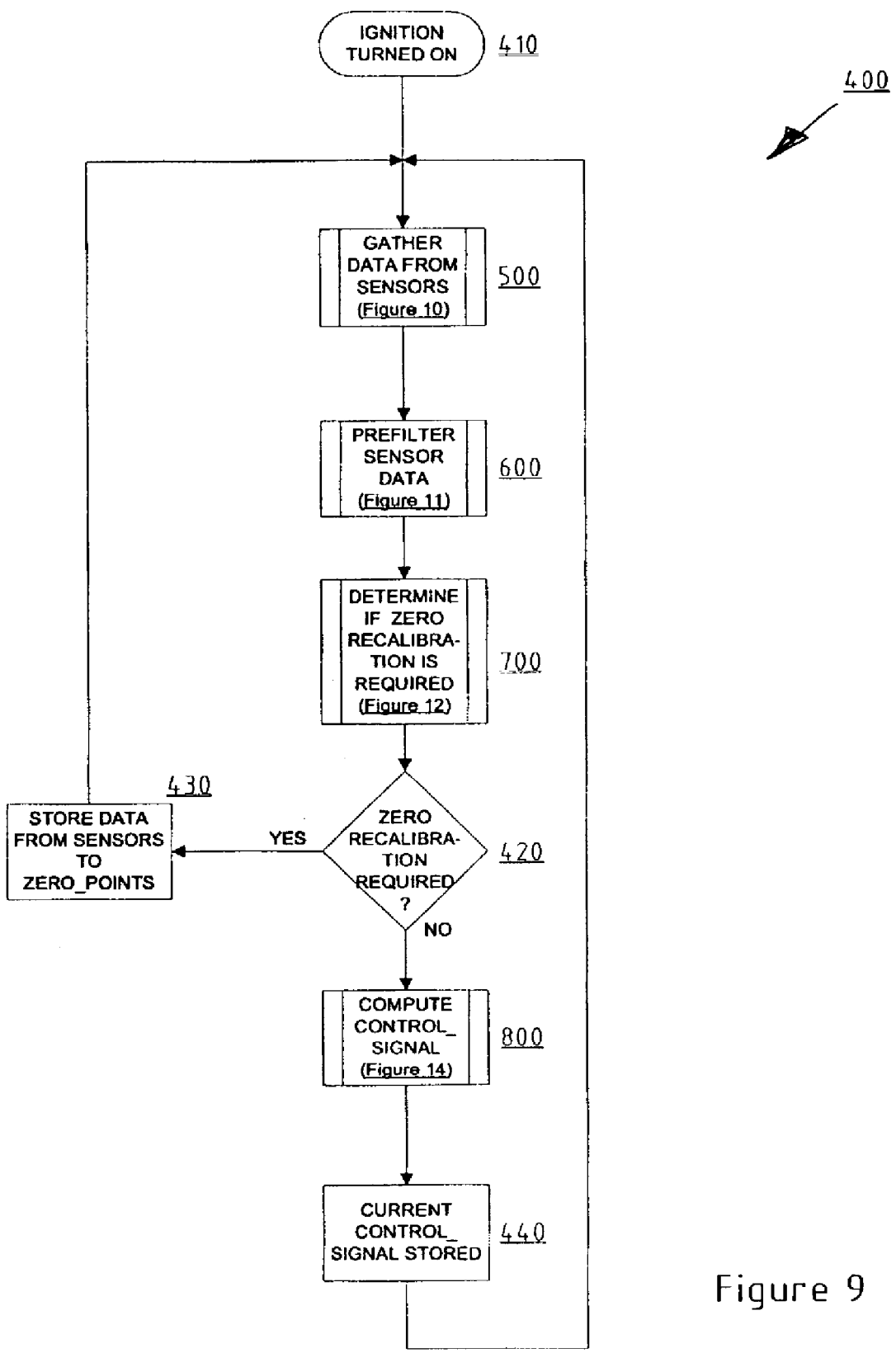
FIG. 9 is a flow chart showing the overall method of steps that may be employed to read and analyze the outputs of the weight sensors.
Figure 10:
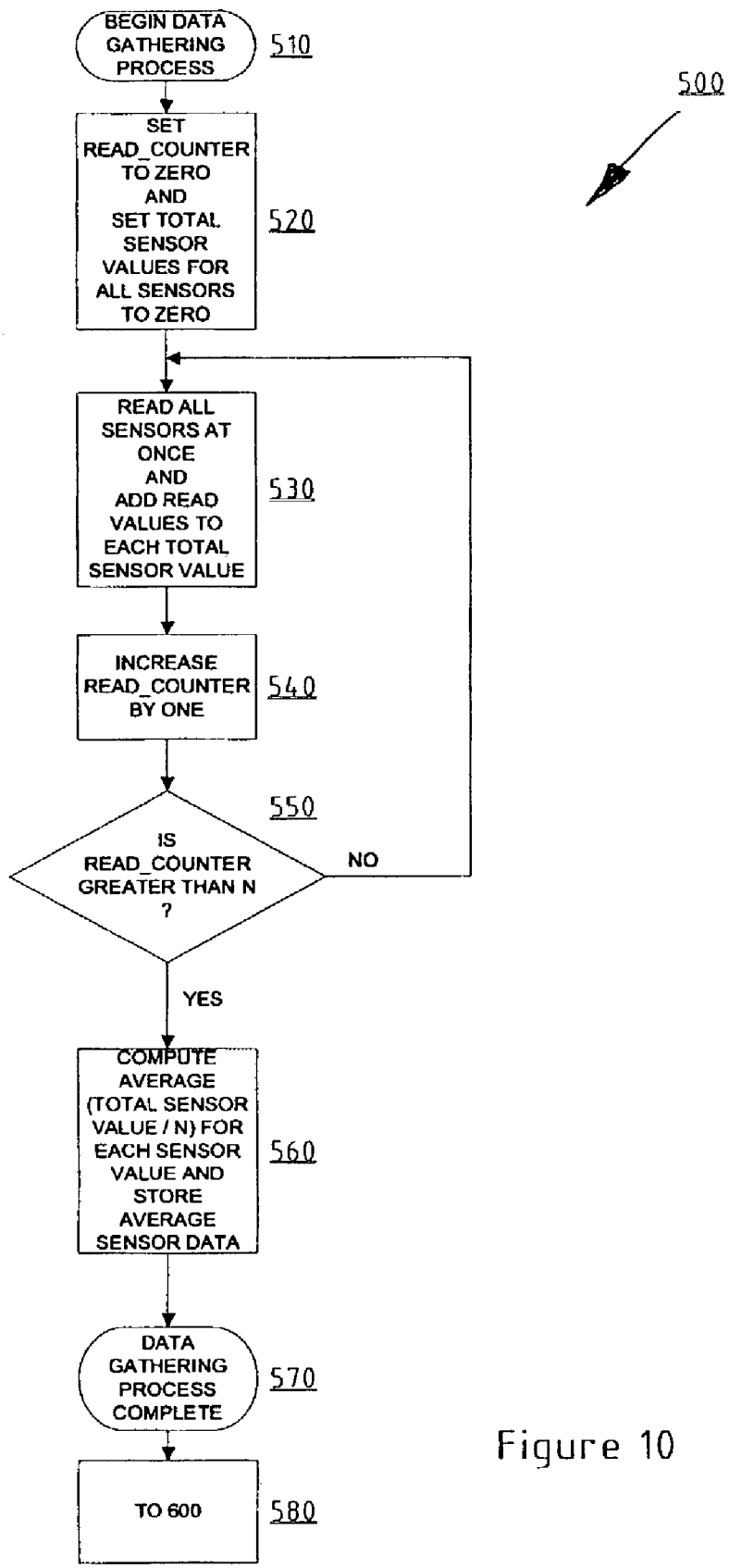
FIG. 10 is a flow chart showing the sub-process designated as 500 in FIGS. 8 and 9 to gather data from the sensors.

In FIG. 9, a flow chart shows the categorization process 400 that is used to identify and categorize the occupant/load present on the seat bun 104. (The following discussion will involve frequent references to other, more detailed flow charts provided in FIGS. 10, 11, 12, 13 and 14.) In this example, the system processor 114 initiates the categorization process 400 when the system is turned on, preferably at step 410 by sensing when the ignition or start switch is turned on in the associated vehicle. The first step is to gather data from each weight sensor 108 by sub-process 500, which is shown in FIG. 10.

Data gathering sub-process 500 begins with step 510 and proceeds to step 520 where a Read Counter is set to zero and the total sensor value for each of the sensors is set to a zero value. At step 530 all the sensors are read at once and the output signal value for each sensor is added to the total for each sensor. At step 540 the Read Counter is incremented by one count. At step 550, a determination of whether the Read Counter has been incremented past a predetermined value "N". In this example, the value of N is 4. This allows the sensors to be read five times so that an average sensor output value can be determined. This procedure of averaging the data over a predetermined number of cycles serves to minimize the effects of electromagnetic or other background interference that may impact the readings from the weight sensors 108.

If the determination at step 550 is that the Read Counter is less than N, steps 530, 540 and 550 are repeated until the Read Counter has been incremented to a value greater than N. When step 550 determination is in the affirmative, the data gathering sub-process 500 proceeds to step 560 where the average sensor value is computed for each sensor from the total values produced at step 530. The average value for each sensor output is stored at step 560 as average sensor data. The data gathering sub-process 500 is completed at 570 and proceeds to the sensor data pre-filtering sub-process 600, within categorization process 400 (or the initial power-up sub-process 300, as appropriate).

Figure 11:
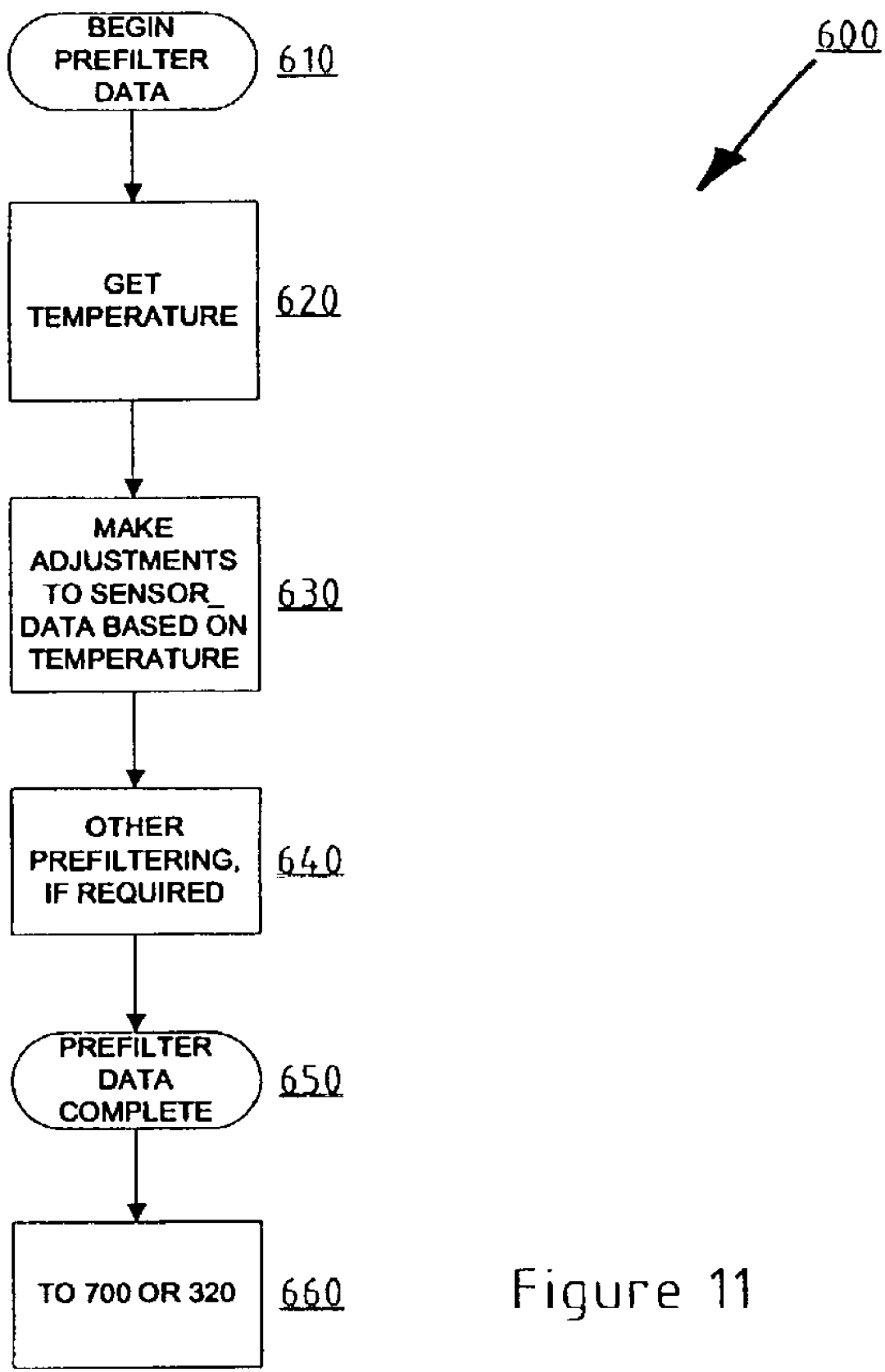
FIG. 11 is a flow chart showing the sub-process designated as 600 in FIGS. 8 and 9 to pre-filter the sensor data.

The sensor data pre-filtering sub-process 600 is shown in FIG. 11 as beginning with step 610. A temperature reading is taken at step 620 from the ambient temperature sensor 110. Based on the value of the temperature reading at step 620, the sensor data pre-filtering sub-process 600 makes adjustments to the sensor data at step 630. In this example, pre-filtering adjustments are made to the sensor data for each weight sensor according to a predetermination of how such temperature values are known to effect the sensor data. Such pre-filtering adjustments may be necessary when the sensors are heat sensitive and produce varying readings according to variations in temperature; or when the degree of seat compression by predetermined loads is effected by temperature and/or humidity. If humidity is deemed to effect the readings, then a humidity sensor can be installed to provide such data and appropriate pre-filtering will be made to the sensor data at step 640. Similarly, other ambient conditions that can be sensed and measured as having a predictable effect on the sensor data, can also be pre-filtered in step 640. When the sensor data pre-filtering sub-process 600 is completed at step 650, the categorization process 400 proceeds to the "determine if re-zero recalibration is required" sub-process 700 (or to step 320 within the initial power-up process 300, as appropriate).

Figure 12:
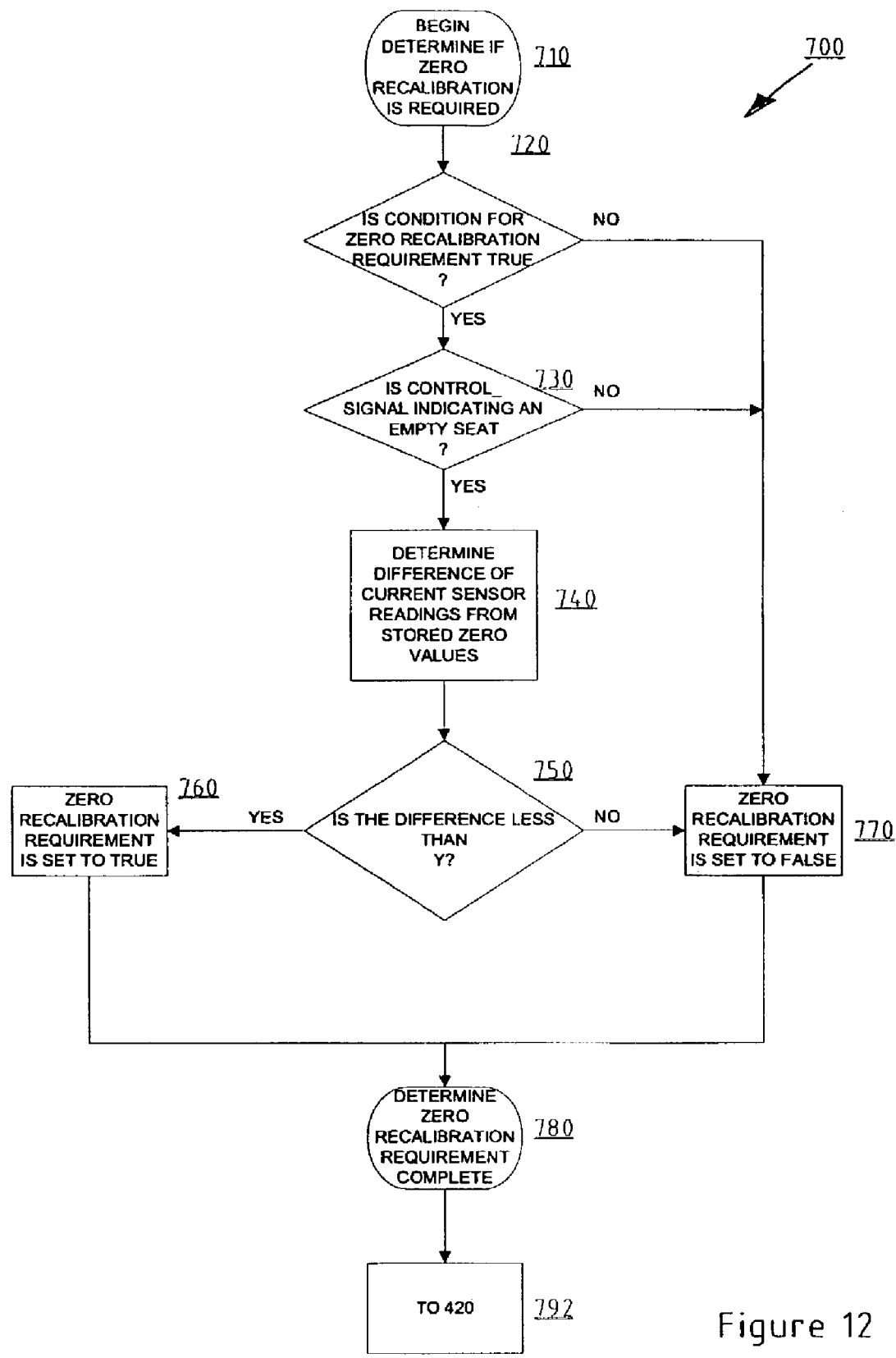
FIG. 12 is a flow chart showing the sub-process designated as 700 in FIG. 9 to determine if "rezero" recalibration of the sensor data is required.

In FIG. 12, the "determine if zero recalibration is required" sub-process 700 is shown as starting at step 710. This sub-process is repeatedly performed over the life of the system to adjust the base readings from each weight sensor under a no-load condition. This may be necessary in order to accommodate for deteriorating cushion material or for other changes that could otherwise adversely effect the sensor readings. As it is not possible to check for such changes directly, an auxiliary variable, such as operation time of the system or number of ignition cycles of the engine, is used to determine the need for zero recalibration. This variable is examined in step 720. If there is no need for zero recalibration, the corresponding flag is set to FALSE in step 770, which completes the sub-process 700. If condition for zero recalibration requirement is satisfied, the system verifies whether the current control signal indicates an empty seat in step 730. If the seat is not empty, zero recalibration is explicitly impossible and the flag is set to FALSE in step 770 completing the sub-process 700. If the seat is empty, the system further verifies whether the zero recalibration is implicitly possible in step 740. This step is used to determine the difference of the current sensor data and the stored zero calibration values. Ideally the difference should be zero if the seat is empty and there has been no deterioration of the seat or sensor components. In practice this value will be small but nonzero, reflecting the changes in seat bun and/or sensors. However, in some situations, the seat could be occupied by object(s), such us suitcases that are correctly classified as an empty seat due to their weight and pattern characteristics, but cause deflection of the seat bun and produce relatively large nonzero output values of the sensors. For this reason, at step 750 the difference is compared to a predetermined value Y. If the computed difference is less than Y, the corresponding flag is set to TRUE at step 760. Otherwise, the flag is set to FALSE at step 770 to avoid introduction of bias caused by the presence of light objects during recalibration. The sub-process 700 is completed at step 780 and the processor takes up step 420 in the categorization process 400 shown in FIG. 9.

Figure 14:
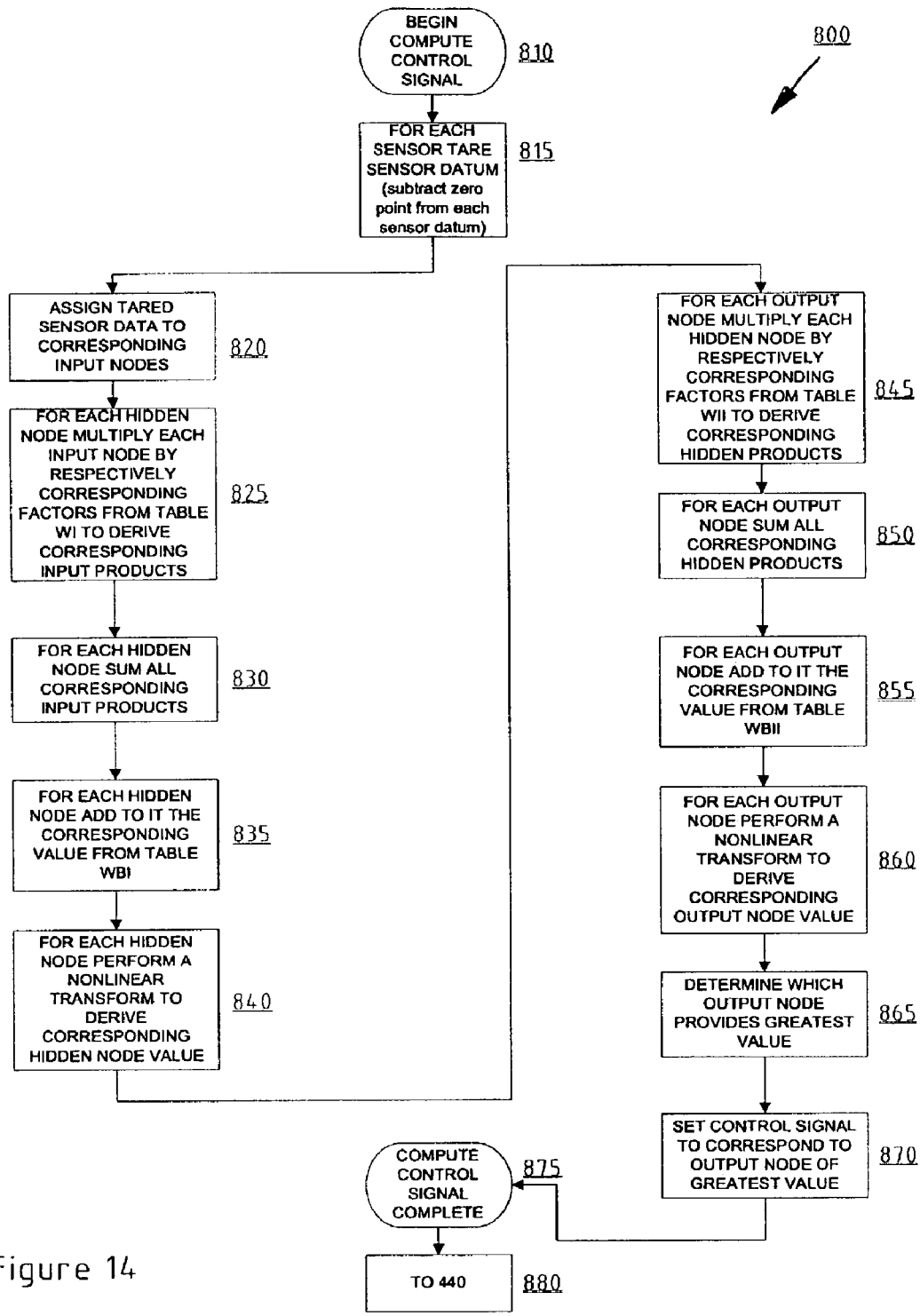
FIG. 14 is a flow chart showing the sub-process designated as 800 in FIG. 9 to compute the control signal in a manner that simulates a neural network.

Referring to FIG. 9, step 420 looks at the rezero required flag and if it is set to True, causes categorization process 400 to proceed to step 430 where the data from the sensors is considered to be at zero values and is so stored. If, on the other hand, the rezero required flag is seen as set to False at step 420, categorization process 400 is caused to proceed to the compute control signal sub-process 800 as shown in FIG. 14.

The compute control signal sub-process 800 is the final sub-process in categorization process 400 and provides an output signal that is essential to allowing an associated air bag deployment sub-system to know how the seat load is categorized for an occupant—and therefore, whether or how much to deploy the airbag in the event of a vehicle collision. Since people come in a wide range of shapes and sizes, the processor 114 must be programmed so as to be capable of recognizing weight patterns of various sized human occupants and loads such as infant seats and generalizing them to yield correct output for any occupant or load. A learning system, such as a neural network system, is utilized to provide such functionality in the form of tables that are then referenced by the on-board system processor 114. The tables of values generated from the neural network in the learning system are referenced by the processor while applying an algorithm that simulates a neural network, and thereby requires less memory and processing power than an actual on-board neural network processor would require.

A neural network simulation consists of two basic elements: nodes and connections. Nodes are additive, summing all values from connections entering the node and sending that value to the connections leaving the node. Connections are multiplicative, multiplying a value passing through a connection by the weight associated with it. The signals outputting the node are usually conditioned using a transfer function assisting the neural network in achieving desired nonlinear characteristics. To create the basic architecture for a neural network simulation, nodes and connections are usually arranged into conceptual "layers" of different sizes. The input layer receives the input from the source. Conversely, the output layer creates the output for the user. The size of the input layer and the output layer are determined by the desired amount of inputs and outputs. The hidden layers, so named because they are conceptually hidden from the outside of the network, determine the non-linearity and generalization capabilities of the network. By changing the size of the layers (i.e., the number of nodes), higher resolution and more detail of the pattern may be obtained, thereby allowing a wider variety of patterns/classes to be recognized. At the same time, the size of the layers must be kept as small as possible to keep the minimize the storage and processing requirements of the system and to optimize its generalization capabilities. In practice, the size of the layers are determined experimentally to resolve this trade-off.

Figure 13:
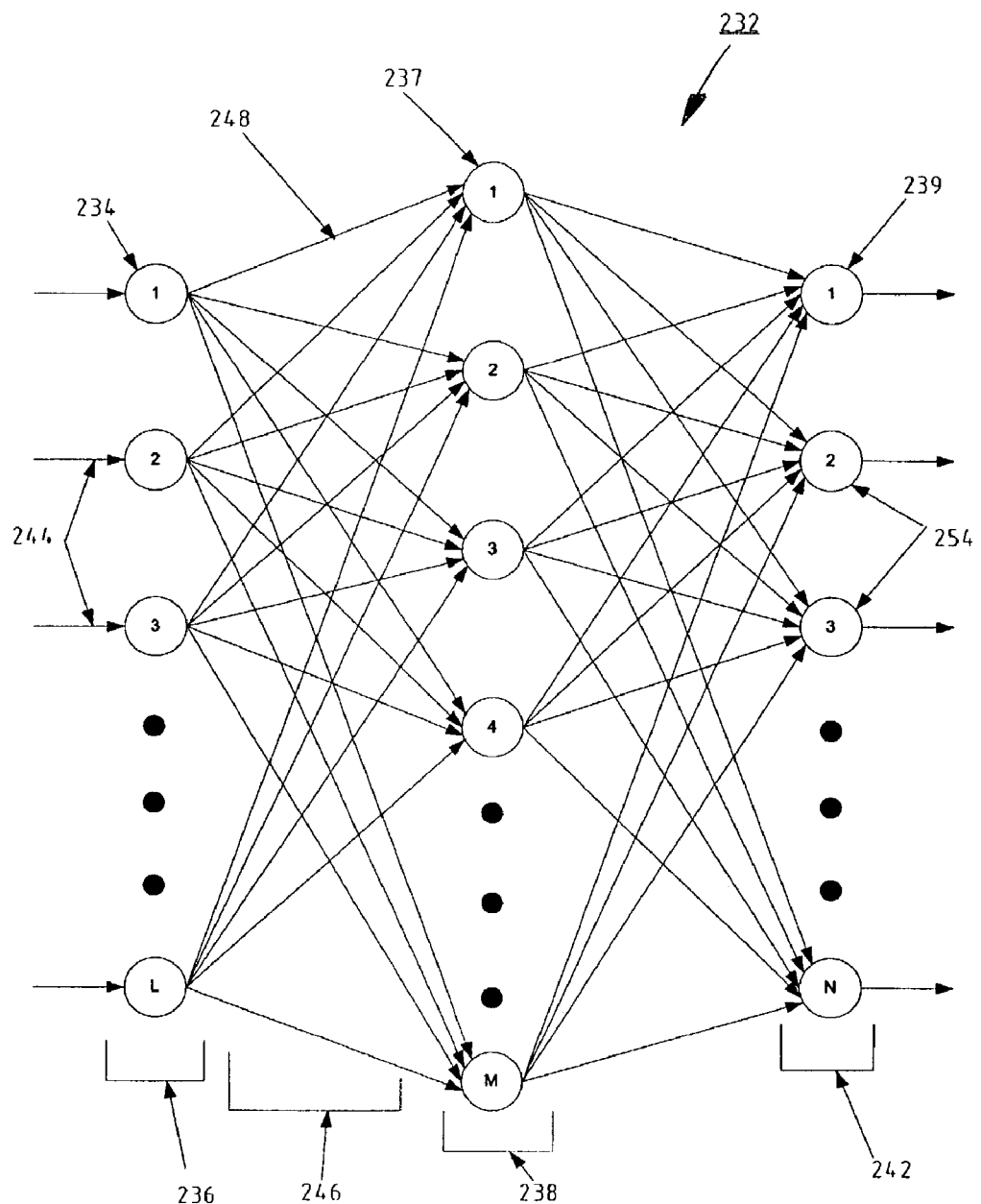
FIG. 13 is a block diagram of a neural network simulation.

In FIG. 13, a block diagram conceptually represents a neural network 232. In this example, the architecture of the network 232 contains sixteen individual nodes 234 in the input layer 236; M individual nodes 237 in the hidden layer 238; and "N" nodes 239 in the output layer 242, where the value of M is obtained experimentally as described above, and the value of N is given by the desired number of occupant categories (e.g. N=3 for the classification describe in FIG. 15). Each node 234 in the input layer 236 receives at input 244 a preprocessed value from a corresponding weight sensor 108 in the array of such sensors. Each node 234 in the input layer 236 is connected to each individual node 237 in the hidden layer 238 with multiplicative connections 246 each being assigned a weight factor 248. Every node 237 in the hidden layer 236 is further connected to each node 239 in the output layer 242. Tables are prepared as a result of the learning process and contain values that respectively correspond to the individual weight sensors and their respective readings. The tables are referenced by sub-processor 114 in order to simulate the network 232 by multiplying, summing, and conditioning the readings according to its algorithm in order to provide an output that is indicative of predetermined classifications and categories of seat occupants, and according to the sensed weight distribution over the weight sensor array. The outputs 254 of the output layer 242 may then be used by the associated airbag deployment system as a control signal as mentioned above. It should be noted that this architecture is not the only available architecture for the simulated network 232. As seat buns become more complex and as a wider of variety of patterns is to be recognized, the size of the network 232 may grow and change.

In FIG. 14, the compute control signal sub-process 800 is shown that simulates a neural network protocol and begins at step 810. At step 815, the sensor datum is tared for each sensor. Taring is achieved by subtracting the stored zero point from each sensor's averaged sensor value that is stored in step 560 of FIG. 10. The result is a net value that is reflective of a load applied to each weight sensor 108. At step 820, the tared sensor data is assigned according to respectively corresponding input nodes. For each hidden node, the tared sensor data value at each assigned input node is respectively multiplied by a factor from a table designated WI to derive corresponding input products, at step 825. In simulating a neural network, each input value is multiplied by a distinctly addressed factor read from table WI at step 825. The WI factors are addressed according to the unique identity of each hidden node. Following the multiplication at step 825, all corresponding input products are summed for each hidden node in step 830. For each hidden node, a value is added to the sum that is derived from a table designated WBI at step 835. The WBI values are addressed according to the unique identity of each hidden node. A sigmoid function is then taken at step 840 of the value derived at step 835 for each hidden node, in order to derive a corresponding hidden node value. For each output node, the hidden node value at each hidden node is respectively multiplied by a factor from a table designated WII to derive corresponding hidden products, at step 845. In continuing to simulate a neural network, each hidden node value is multiplied by a distinctly addressed factor read from table WII at step 845. The WII factors are addressed according to the unique identity of each output node. Following the multiplication at step 845, all corresponding hidden products are summed for each output node in step 850. For each output node, a value is added to the sum that is derived from a table designated WBII at step 855. The WBII values are addressed according to the unique identity of each output node. A sigmoid function is then taken at step 860 of the value derived at step 855 for each output node, in order to derive a corresponding output node value. At this stage of sub-process 800, a comparison step 865 is performed in order to determine which output node has the greatest output node value. The control signal is than set to correspond to the output node with greatest value at step 870. The sub-process 800 is completed at step 875, thereby returning to step 440 in categorization process 400 of FIG. 9.

Again referencing FIG. 9, the categorization process 400 shows that in step 440 the current control signal derived by sub-process 800 is stored for access by an associated deployment control system, or by any other system that requires to know the categorization of an occupant or load present above the sensor array.

In FIG. 9, it can be seen that the categorization process 400 is repeated at predetermined intervals following step 440 during the time the vehicle is in operation. Categorization determinations are made with each cycle of the process in order to provide a control signal to the associated deployment control system. The associated deployment control system then uses the control signal stored at step 440 to deploy or not deploy the airbag according to the classification as mandated and shown in FIG. 15.

Although FIG. 15 shows the current mandate for classification into three classes based upon sensed occupant characteristics, it is anticipated that in the future, as airbag deployment force, size and speed is more precisely controlled, there may be several more classes for degraded deployment based upon the sensed occupant characteristics described in FIG. 15.

It should be understood that the foregoing description of the embodiments is merely illustrative of many possible implementations of the present invention and is not intended to be exhaustive.

What is claimed is:

1. A vehicle seat occupancy detection system comprising:
    a seat bun forming a portion of the seating cushion for an occupant's seat, wherein said seat bun has a substantially horizontal upper surface portion, a lower surface portion and a plurality of cavities arrayed in a predetermined pattern; a plurality of weight sensor devices mounted substantially in said array of cavities, each weight sensor device having first and second relatively movable parts that are aligned for relative movement with respect to each other in a path that is substantiality perpendicular to said seat bun surfaces, said first part being mounted below said upper surface portion, said second part being spaced below said first part, each of said weight sensor devices being operative to produce signals indicative of the distance between said first and second parts; and
    a processor for receiving said sensor signals and interpreting the signals from said plurality of weight sensors to produce an output control signal corresponding with the weight and pattern of a load applied to the upper surface portion of said seat bun.

2. A vehicle seat occupancy detection system as in claim 1, wherein said first part comprises a magnetic field emitter and said second part includes a Hall-effect sensor.

3. A vehicle seat occupancy detection system as in claim 2, wherein each said weight sensor device includes a compressible housing that encloses first and second parts of said sensor device and said housing is adapted for mounting into a cavity.

4. A vehicle seat occupancy detection system as in claim 3, wherein said compressible housing is formed to limit the amount of relative movement between the first and second parts and prevent said first and second parts from coming into direct contact with each other.

5. The system as set forth in claim 1, wherein said processor comprises a general purpose microprocessor operating a program, the program comprising an algorithm for producing the control signal, the combination of the microprocessor and the program being operative to access a table of weights for use by said algorithm, said table of weights derived by a training system for the fixed algorithm, the combination of the microprocessor and the program further operative to input the sensor signals and the table of weights into said algorithm and to operate said algorithm and thereby produce said output control signal.

6. The system as set forth in claim 5, wherein said algorithm includes a process that simulates a predetermined neural network comprising:
    an input layer of a plurality of input nodes, each input node adapted to receive the sensor signal from a corresponding weight sensor and to produce a signal for use by nodes in a subsequent layer of a plurality of hidden nodes;
    at least one hidden layer of a plurality of hidden nodes, each hidden node adapted to receive and weight each signal from each input node in said input layer and to produce a signal for use by nodes in a subsequent layer of a plurality of output nodes; and
    an output layer of a plurality of output nodes, each output node adapted to receive and weight each signal from each hidden node in the preceding hidden layer and to produce an output signal.

7. The system as set forth in claim 6, wherein said process compares said output signals from each output node, determines which output signal is the most dominant, and selects the control signal according to the most dominant output signal.

8. The system as set forth in claim 7, wherein said processor further comprises means for maintaining the control signal produced in response to an occupant occupying the seat in a steady state during momentary changes in the occupant's occupancy of the seat.

9. A sensor for use in a system that measures weight or other forces applied in a first direction, comprising:
    a first element configured to be mounted on a relatively immovable support element;
    a second element configured to be movable in a predetermined path with respect to said first element, in response to said applied weight or other forces;

a spring element mounted between said first and second elements to provide predetermined resistive forces to the applied weight or other forces;

wherein, said first element contains a central bore for accepting and guiding said second element during its relative movement with respect to said first element along said predetermined path; said second element contains a central probe that fits within said central bore for relative movement therein along said predetermined path;

said central probe includes a permanent magnet; said first element contains a magnetic field sensor that is electrically and physically connected to a flexible circuit layer below said first element and that is mounted within said central bore in a position that is an extension of, but beyond said predetermined path; and said flexible circuit layer coextends with the surface of said relatively immovable support element to which said first element is physically connected.

10. A sensor as in claim 9, wherein said magnetic field sensor is a Hall-effect sensor.

11. A sensor as in claim 9, wherein said spring element is formed from a non-magnetic material that does not interfere with said magnetic field sensor and is mounted outside said central bore.

12. A plurality of weight sensors for use in a system that measures weight or other forces applied in a first direction, wherein said sensors are each mounted on a relatively immovable base substrate in a predetermined array, and wherein each sensor includes:

a first element configured to be mounted on said base substrate; a second element configured to be movable in a predetermined path with respect to said first element, in response to said applied weight or other forces;

a spring element mounted between said first and second elements to provide predetermined resistive forces to the applied weight or other forces;

wherein, said first element contains a central bore for accepting and guiding said second element during its relative movement with respect to said first element along said predetermined path; said second element contains a central probe that fits within said central bore for relative movement therein along said predetermined path;

said central probe includes a permanent magnet;

said first element contains a magnetic field sensor with power, ground and output signal terminals that are electrically and physically connected to a flexible circuit layer below said first element and is mounted within said central bore in a position that is an extension of, but beyond said predetermined path; and said flexible circuit coextends with the surface of said relatively immovable base substrate to which said first element is physically connected; and said flexible circuit provides common ground and common power connections to corresponding ground and power terminals, and a dedicated output connection to the output signal terminal of each of said magnetic field sensors.

13. A sensor as in claim 12, wherein said magnetic field sensor is a Hall-effect sensor.

14. A sensor as in claim 12, wherein said spring element is formed from a non-magnetic material that does not interfere with said magnetic field sensor and is mounted outside said central bore.

15. A method of detecting the classification of an occupant load on the seat cushion of a vehicle comprising the steps of:

providing a seat bun forming a portion of the seating cushion for an occupant's seat, wherein said seat bun is provided with a substantially horizontal upper surface portion, a lower surface portion and a plurality of cavities arrayed in a predetermined pattern;

providing a plurality of weight sensor devices mounted substantially in said array of cavities, wherein each weight sensor device is provided to have first and second relatively movable parts being aligned for relative movement substantially perpendicular to said seat bun surfaces, said first part being mounted below said upper surface portion, said second part also being spaced below said first part; each said weight sensor device being operative to produce signals indicative of the distance between said first and second parts; and providing a processor for receiving said sensor signals and interpreting the signals from said plurality of weight sensors to produce an output control classification signal corresponding with the weight and pattern of the occupant load applied to the upper surface portion of said seat bun.

16. A method as in claim 15, wherein said weight sensor devices are provided to include Hall-effect sensors and magnetic field emitters.

17. A method as in claim 15, wherein said weight sensor devices are provided to have said first part include a magnetic field emitter and to have aid second part include a Hall-effect sensor.

18. A method as in claim 17, wherein said weight sensor devices are provided to have a compressible housing that encloses first and second parts of said sensor device and said housing is adapted for mounting into a cavity.

19. A method as in claim 18, wherein said weight sensor devices are provided to have said compressible housing formed so as to limit the amount of relative movement between the first and second parts and to prevent said first and second parts from coming in direct contact with each other.

20. A method as in claim 15 wherein said processor is provided as a general purpose microprocessor operating a program, wherein the program performs an algorithm for producing the output control classification signal, the combination of the microprocessor and the program being operative to access a table of weights for use by said algorithm, said table of weights being derived by a training system for the fixed algorithm, the combination of the microprocessor and the program being further operative to input the sensor signals and the table of weights into said algorithm and to perform said algorithm to thereby produce said output control classification signal.

21. A method as set forth in claim 20 wherein said algorithm further performs a process that simulates a predetermined neural network comprising:

the steps of inputting all sensor signals to an input layer containing a plurality of input nodes, wherein each input node is adapted and provided to receive a sensor signal from a corresponding weight sensor and to produce a signal for use by nodes in a subsequent layer of a plurality of hidden nodes; transmitting all signals at the input nodes to at least one hidden layer containing a plurality of hidden nodes, wherein each hidden node is adapted to receive and weight each signal from each input node and to produce a corresponding hidden node signal for use by nodes in a subsequent layer of a plurality of output nodes; and transmitting all hidden node signals to the output layer containing a plurality of output nodes, wherein each output node is adapted to receive and weight each signal from each hidden node in the preceding layer of hidden nodes and to produce an output signal.

22. A method as set forth in claim 21 wherein said processor performs steps that compare said output signals from each output node, determine which output signal is the most dominant, and select the output control classification according to the most dominant output signal.

23. A method of classifying a load present on a vehicle seat, comprising the steps of:
providing a seat bun having top and bottom surfaces, the seat bun further provided with a plurality of laterally-spaced apart cavities extending upwardly from the bottom surface part way into the seat bun towards the top surface;
providing a load sensor in each cavity for determining the compression of the seat bun due to a load being present on the top surface, each load sensor being provided as operative to produce a sensor signal representative of the compression of the seat bun at its respective location in the seat bun; providing signal processing coupled to each load sensor for receiving and interpreting the sensor signals to determine a distribution pattern and weight of the load present on the top surface and for producing a classification signal indicative of a class of the load, for a vehicle subsystem;
producing sensor signals in response to a load being present on the top surface;
receiving and interpreting the sensor signals to determine the distribution pattern and weight of the load thereby determining the class of the load; and
producing the classification signal.

24. A method as set forth in claim 23 wherein each load sensor has first and second relatively movable parts being aligned for relative movement substantially perpendicular to said seat bun surfaces, said first part being mounted below said upper surface portion, said second part also being spaced below said first part, operating each of said load sensors to produce signals indicative of the distance between said first and second parts.

* * * * *